United States Patent [19]

Hill

[11] Patent Number: 5,556,505
[45] Date of Patent: Sep. 17, 1996

[54] WINDSHIELD ASSEMBLY SYSTEM

[75] Inventor: Robert A. Hill, Melvindale, Mich.

[73] Assignee: Ford Motor Company, Dearborn, Mich.

[21] Appl. No.: 277,921

[22] Filed: Jul. 5, 1994

[51] Int. Cl.[6] .......................... B32B 31/04; B65G 49/06; B65G 57/04; B65H 3/32

[52] U.S. Cl. ......................... 156/570; 156/563; 156/566; 156/572; 271/18; 414/793.1; 414/797; 901/40

[58] Field of Search ................................. 156/539, 542, 156/556, 558, 559, 560, 562, 566, 569, 570, 572, 106, 563; 901/40; 414/797, 737, 793.1; 271/91, 103, 105, 106, 18

[56] References Cited

U.S. PATENT DOCUMENTS

| | | | |
|---|---|---|---|
| 2,594,373 | 4/1952 | Watson | 271/105 |
| 2,920,989 | 1/1960 | Cochran et al. | 156/556 |
| 3,167,184 | 2/1965 | Galvin | 901/40 X |
| 3,275,317 | 9/1966 | Fromm, Jr. | 271/106 |
| 3,637,092 | 1/1972 | George et al. | 901/40 X |
| 3,669,445 | 6/1972 | Wallis | 271/18 X |
| 3,693,321 | 9/1972 | Nilsson | 414/797 X |
| 3,826,485 | 7/1974 | Shindo | 414/797 X |
| 4,129,328 | 12/1978 | Littell | 294/65 |
| 4,184,672 | 1/1980 | Watkins et al. | 271/105 |
| 4,228,993 | 10/1980 | Cathers | 901/40 X |
| 4,366,013 | 12/1982 | Valimont et al. | 156/102 |
| 4,367,107 | 1/1983 | Valimont et al. | 156/102 |
| 4,368,087 | 1/1983 | Valimont et al. | 156/106 X |
| 4,420,361 | 12/1983 | Valimont et al. | 156/556 |
| 4,772,006 | 9/1988 | Guglielmetti et al. | 271/106 X |
| 4,793,657 | 12/1988 | Mense | 294/65 |
| 4,863,340 | 9/1989 | Masunaga et al. | 414/789.5 |
| 4,956,034 | 9/1990 | Shinozaki et al. | 156/106 X |
| 5,323,918 | 6/1994 | Fair | 156/572 X |

FOREIGN PATENT DOCUMENTS

| | | |
|---|---|---|
| 0086280 | 8/1983 | European Pat. Off. . |
| 0210923 | 2/1987 | European Pat. Off. . |
| 0319251 | 6/1989 | European Pat. Off. . |
| 2594812 | 8/1987 | France . |
| 4218203 | 12/1993 | Germany . |
| 60-204537 | 10/1985 | Japan . |

*Primary Examiner*—Michael W. Ball
*Assistant Examiner*—Francis J. Lorin
*Attorney, Agent, or Firm*—Lorraine S. Melotik, Esq.; Roger L. May, Esq.

[57] ABSTRACT

A windshield assembly system for assembling windshield assemblies for vehicles includes a conveyor for delivering at least two plys of glass to an assembly station, a first robot for lifting one of the two plays from the conveyor, a second robot for gripping and removing at least one adhesive sheet from a stack of adhesive sheets and placing the removed adhesive sheet adjacent the other one of the two plys, whereby the first robot places the one of the two plys adjacent the removed adhesive sheet to assemble the windshield assembly. The apparatus includes a sheet edge separator such as a knife or blade movable along a longitudinal edge of the top sheet for separating at least a portion of the top sheet from the stack of adhesive sheets.

4 Claims, 5 Drawing Sheets

WINDSHIELD ASSEMBLY SYSTEM

BACKGROUND OF THE INVENTION

1. Field of the Invention

The present invention relates generally to windshields for vehicles and, more specifically, to a windshield assembly system for assembling windshield assemblies for automotive vehicles.

2. Description of the Related Art

It is known to provide a windshield assembly for vehicles such as automotive vehicles. The windshield assembly typically includes an inner or short ply of glass and an outer or long ply of glass which are secured together by an adhesive sheet. Commonly, the short ply has a paint band along one edge which acts to hide mechanical components (e.g., wiper). Also, the adhesive sheet has a gradient band along one edge which acts as a sun shade and is aligned with the paint band.

Currently, the windshield assemblies are assembled in a manual assembly station. Typically, a conveyor extends through the manual assembly station and delivers an unlaminated bent long ply and short ply. Operators on opposed sides of the conveyor use an assembly assist lift having suction cups to grip and lift the long ply above the conveyor. The short ply is located in place by locators along the conveyor. The operators grasp an adhesive sheet from a stack adjacent the conveyor and locate the adhesive sheet relative to the short ply by aligning predetermined marks on the gradient band with the paint band. The operators then use the assembly assist lift to lower the long ply near the adhesive sheet and short ply. The long ply is released by discontinuing vacuum to the vacuum cups of the assembly assist lift. The operators manually position the long ply to the adhesive sheet and short ply. The locators are released and the conveyor delivers the windshield assembly to another station which trims off the excess adhesive sheet and heats the windshield assembly to laminate the long ply and short ply together with adhesive sheet.

Although the above manual assembly has worked well, it suffers from one disadvantage in that it requires human intervention for assembly of the windshield assemblies. Another disadvantage of the manual assembly is that it is a difficult task to handle the adhesive sheet because it may stick or adhere to other sheets in the stack. Yet another disadvantage of the manual assembly is that dirt and dust from the operators may be deposited onto the adhesive sheet. Still another disadvantage of the manual assembly is that the repeatability and positioning of the adhesive sheet relative to the short ply is low.

SUMMARY OF THE INVENTION

Accordingly, the present invention is a windshield assembly system for assembling windshield assemblies for vehicles. The windshield assembly system includes a conveyor for delivering at least two plys of glass to an assembly station and a first robot for lifting one of the two plys from the conveyor. The windshield assembly system also includes a second robot having a handler for gripping and removing at least one adhesive sheet from a stack of adhesive sheets and placing the removed adhesive sheet adjacent the other one of the two plys, whereby the first robot places the one of the two plys adjacent the removed adhesive sheet to assemble the windshield assembly.

One feature of the present invention is that a windshield assembly system is provided for assembling windshield assemblies for automotive vehicles. Another feature of the present invention is that the windshield assembly system provides the ability to assemble automotive windshields automatically with minimal human intervention. Yet another feature of the present invention is that the windshield assembly system improves positioning of the adhesive sheet relative to the plys of glass, thereby improving quality. Still another feature of the present invention is that the windshield assembly system allows easier handling of the adhesive sheet and reduces dust and dirt being deposited on the adhesive sheet. A further feature of the present invention is that the windshield assembly system reduces defects, glass overlap scrap, short adhesive sheet, and trimming quality complaints.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
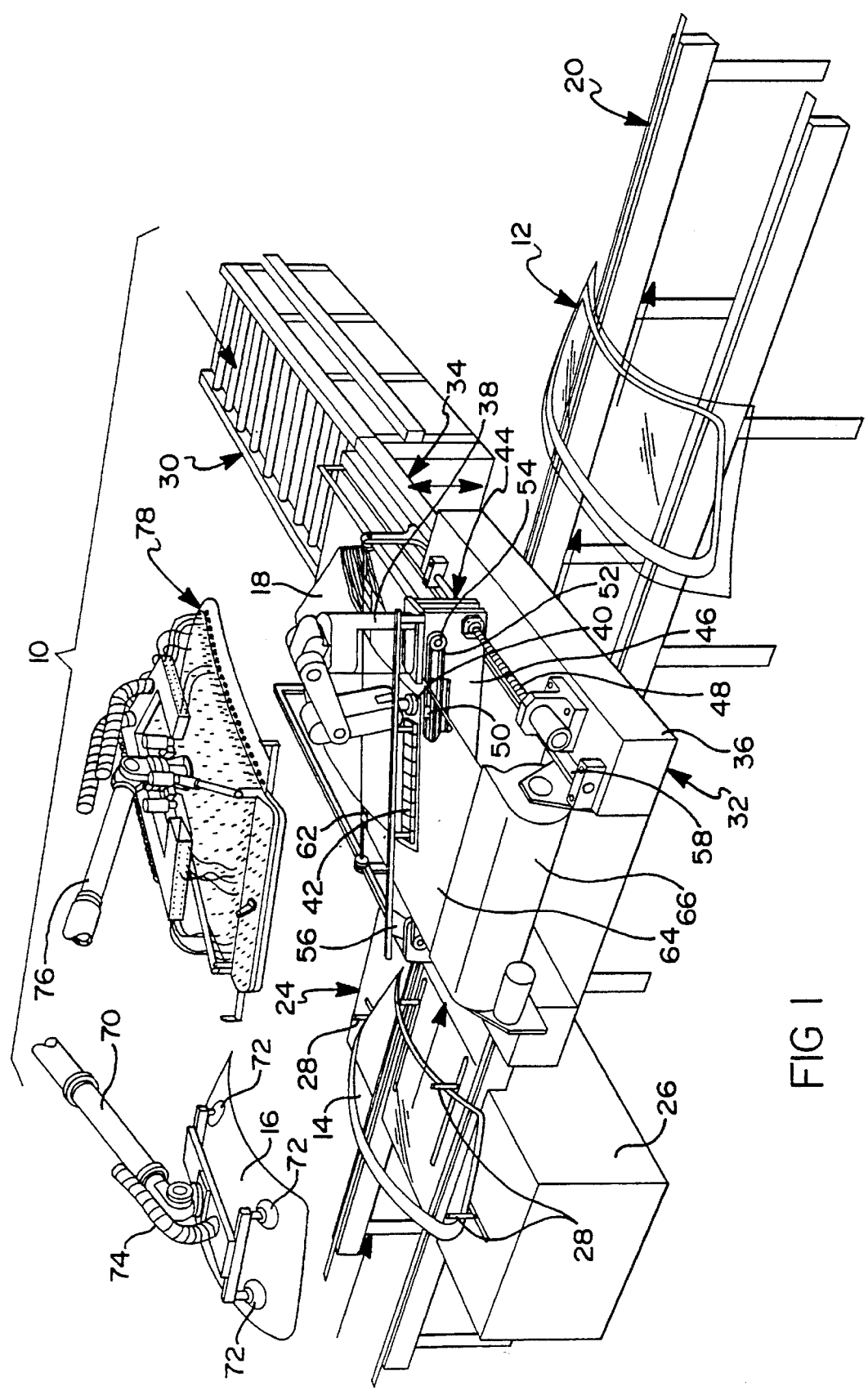
FIG. 1 is a perspective view of a windshield assembly system, according to the present invention, for assembling a windshield assembly.

Referring to the drawing and especially FIG. 1, one embodiment of a windshield assembly system 10, according to the present invention, is shown for assembling a windshield assembly, generally indicated at 12, for a vehicle such as an automotive vehicle (not shown). The windshield assembly 12 includes an inner or short ply of glass 14, an outer or long ply of glass 16 and an adhesive sheet 18 for securing the short and long plys 14 and 16 together. In one embodiment, the adhesive sheet 18 may be made of a polyvinyl butyryl (PVB) and have a thickness of approximately thirty mils (0.030 inches). It should be appreciated that any suitable material may be used for the adhesive sheet 18 such as polyester, polyurethane or silicone rubber. It should also be appreciated hat the plys 14 and 16 and adhesive sheet 18 are contoured.

The windshield assembly system 10 includes a lay-up conveyor, generally indicated at 20, for moving the plys 14 and 16 to an assembly station and for moving the assembled windshield assembly 12 from the assembly station. The lay-up conveyor 20 is conventional and known in the art.

The windshield assembly system 10 also includes a squaring device or locator, generally indicated at 24, for locating the short ply 14 along the lay-up conveyor 20 in the assembly station. The squaring locator 24 has a support structure 26 located below a portion of the lay-up conveyor 20 and a plurality of locator arms 28 which extend upwardly from the support structure 26. The locator arms 28 are moveable by suitable means (not shown) to extend the locator arms 28 in the path of the lay-up conveyor 20 to stop the short ply 14 and to retract the locator arms 28 out of the path of the lay-up conveyor 20 to release the assembled windshield assembly 12. It should be appreciated that the squaring locator 24 is programmable, conventional and known in the art.

The windshield assembly system 10 further includes a transfer cart conveyor, generally indicated at 30, for moving stacks of adhesive sheets 18 to the assembly station. The transfer cart conveyor 30 moves a transfer cart 31 which supports a stack of adhesive sheets 18. The transfer cart conveyor 30 is conventional and known in the art.

The windshield assembly system 10 includes a sheet separation apparatus, generally indicated at 32, for separating individual adhesive sheets 18 from the stack of adhesive sheets 18. The sheet separation apparatus 32 is disposed above the lay-up conveyor 20. The sheet separation apparatus 32 is spaced from the transfer cart conveyor 32 by an elevator, generally indicated at 34. The elevator 34 moves up and down to allow indexing of stacks of adhesive sheets 18 at approximately 0.030 inches per cycle. It should be appreciated that the elevator 34 is conventional and known in the art.

Figure 2:
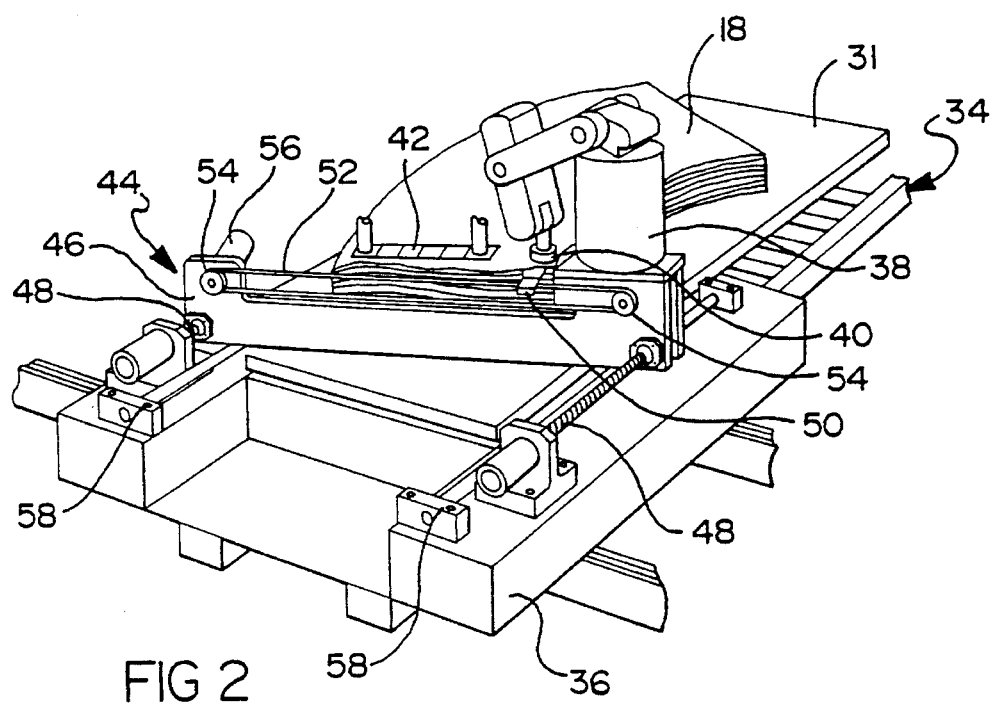
FIG. 2 is an enlarged view of a portion of the windshield assembly system of FIG. 1.

Referring to FIGS. 1 and 2, the sheet separation apparatus 32 includes a base 36 located over the lay-up conveyor 20. The sheet separation apparatus 32 also includes a first robot 38 supported by the base 36. The first robot 38 has a vacuum cup 40 connected to a source of vacuum (not shown) and is used to lift a corner of the adhesive sheet 18. In one embodiment, the first robot 38 is of a miniature vacuum cup handler type which is commercially available from FANUC Corp. of Auburn Hills, Mich.

The sheet separation apparatus 32 may include a segmented compliant vacuum bar 42 for separating a pillar edge of an adhesive sheet 18 from the other adhesive sheets 18 in the stack. The vacuum bar 42 compensates for irregularities in the elevation of the pillar edge of the stack of adhesive sheets 18. The vacuum bar 42 is supported by the base 36 and located relative to the first robot 38 and in close proximity to the pillar edge of the adhesive sheet 18 to grip and lift the pillar edge of the adhesive sheet 18 as a knife 50 and separator blade 62 to be described traverses that edge of the stack. The initial separation of the pillar edge of the adhesive sheet 18 is through a "lift and peel" action of the vacuum bar 42. It should be appreciated that the vacuum bar 42 is connected to a source of vacuum (not shown).

The sheet separation apparatus 32 may include an edge separator, generally indicated at 44, for separating the pillar edge of an adhesive sheet 18 from the other adhesive sheets 18 in the stack. The edge separator 44 has a support member 46 extending longitudinally and a pair of ball screw servo drives 48 for moving the support member 46. The ball screw servo drives 48 move the support member 46 parallel to a centerline of the transfer cart 31. The edge separator 44 also includes a knife 50, a belt 52 connected to the knife 50 and a pair of pulleys 54 supporting the belt 52 and rotatably attached to the support member 46. The belt 52 is rotated by a motor 56 attached to one of the pulleys 54 to move the knife 50 back and forth between the pulleys 54. The edge separator 44 includes a device (not shown) for reading an elevation of the stack of adhesive sheets 18 and changing an elevation of the knife 50 to match the elevation of the stack as the knife 50 traverses along the edge of the stack to compensate for irregularities in the edge of the stack. The sheet separation apparatus 32 further includes a guideway 58 along each side of the support member 46 and supported by the base 36 for guiding the support member 46 generally parallel to the centerline of the transfer cart 31. It should be appreciated that the knife 50 has a relatively dull edge for separating the adhesive sheets 18.

Figure 3:
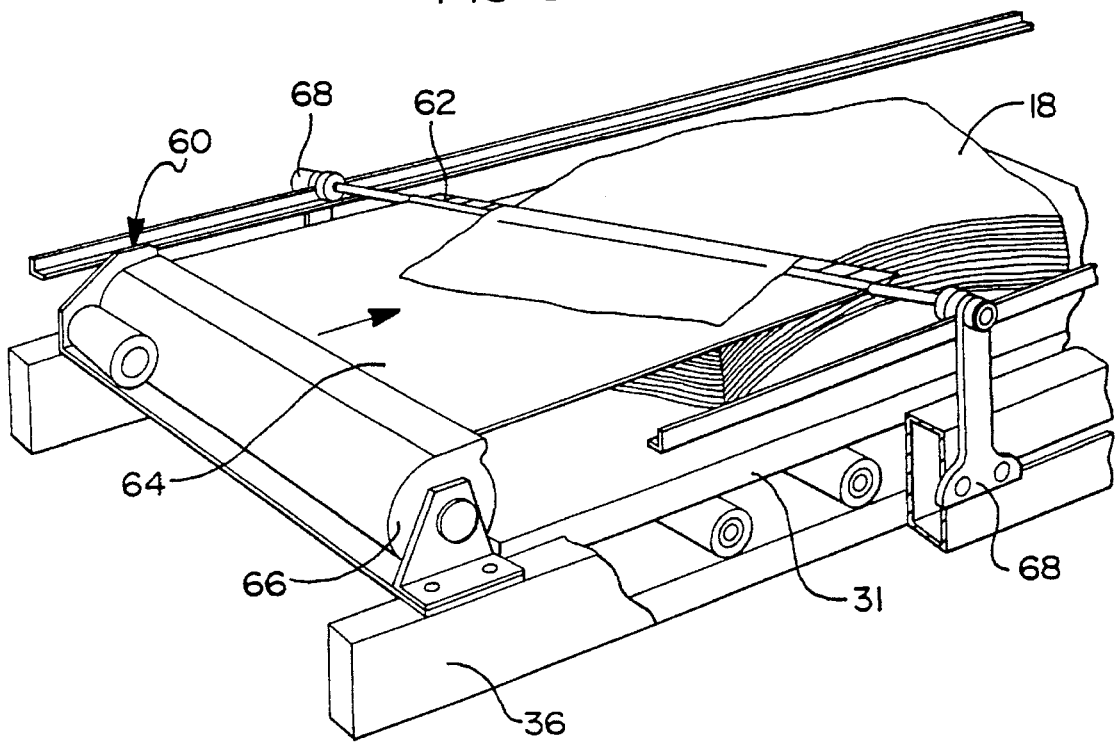
FIG. 3 is an enlarged view of another portion of the windshield assembly system of FIG. 1.

As illustrated in FIG. 3, the sheet separation apparatus 32 may include a sheet separator, generally indicated at 60, for separating an adhesive sheet 18 from the other adhesive sheets 18 in the stack. The sheet separator 60 peels the top adhesive sheet 18 loose from the adjacent adhesive sheets 18 of the stack and overcomes any tendency of the top adhesive sheet 18 to adhere or "stick" to the lower adhesive sheet 18 below the top adhesive sheet 18. The sheet separator 60 includes a separator blade 62 and a shade 64 having a leading edge attached to the separator blade 62. The separator blade 62 is angled relative to the pillar edge of the adhesive sheet 18 and can flex and comply with an irregular elevation of the pillar edge during separation. The shade 64 is coiled or wound about a take-up reel 66 attached to the base 36. Preferably, the shade 64 is perforated for a function to be described. The sheet separator 60 includes a guide mechanism 68 for moving the separator blade 62 along the adhesive sheet 18 generally parallel to the centerline of the transfer cart 31 in order to complete a full separation of the top adhesive sheet 18 from the immediately adjacent adhesive sheet 18 of the stack. It should be appreciated that the separator blade 62 has a relatively dull edge for separating the adhesive sheets 18.

Referring to FIG. 1, the windshield assembly system 10 includes a second robot 70 for moving the upper ply 16 relative to the lay-up conveyor 20. One embodiment of the second robot 70 is a FANUC S-420 type and commercially available from FANUC Corporation of Auburn Hills, Mich. The second robot 70 has a plurality of vacuum cups 72 for gripping the ply 16 and are connected by a conduit 74 to a source of vacuum (not shown).

Figure 4:
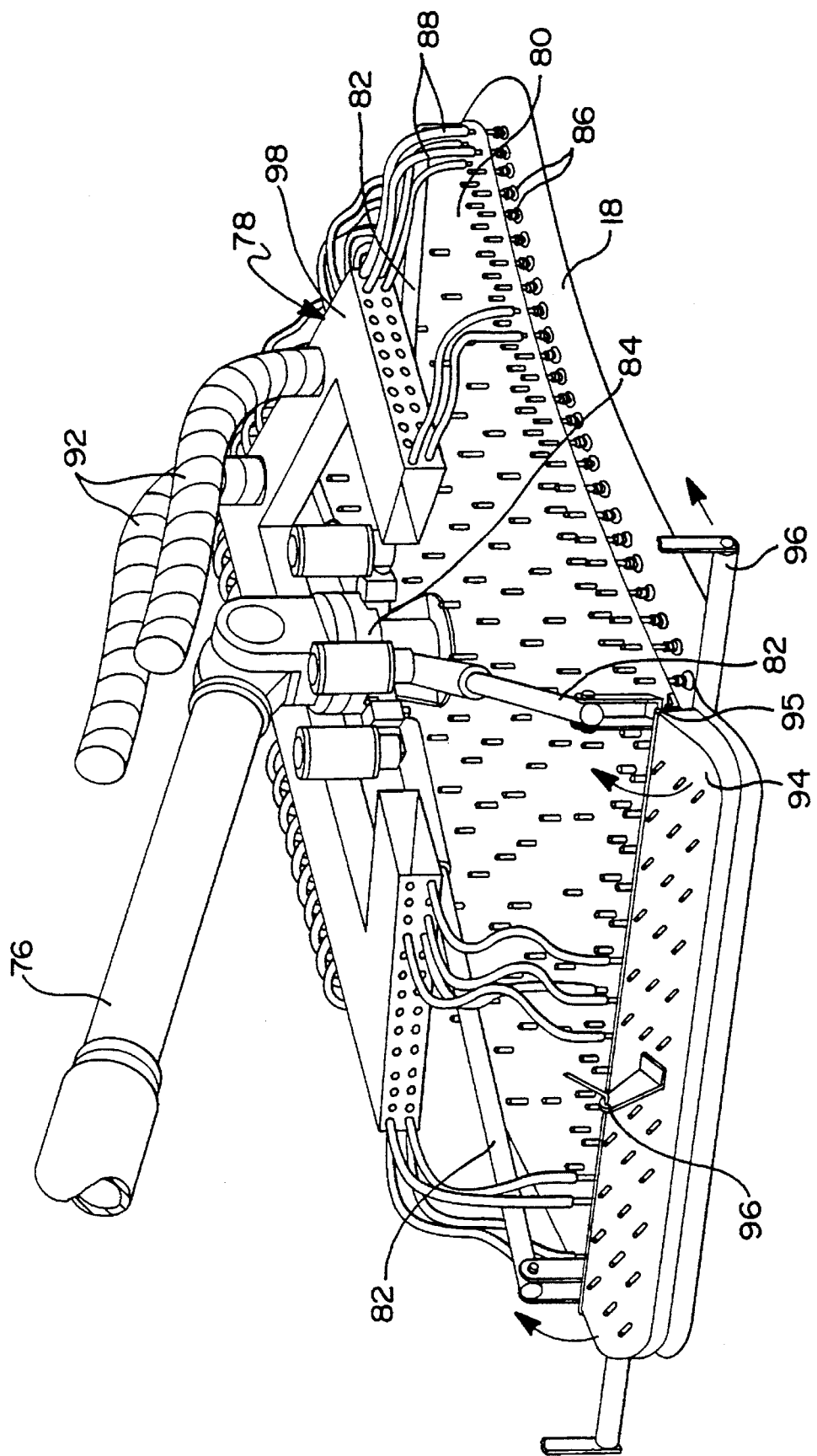
FIG. 4 is an enlarged view of yet another portion of the windshield assembly system of FIG. 1.
Figure 5A:
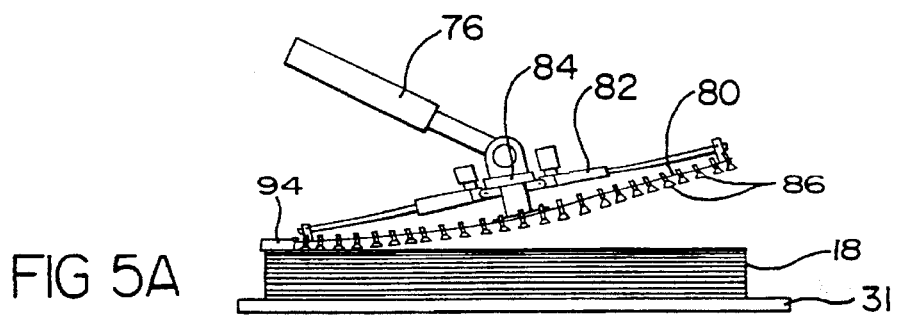
FIG. 5 is a series of elevational views illustrating a sequence of operation of the windshield assembly system of FIG. 1.
Figure 5B:
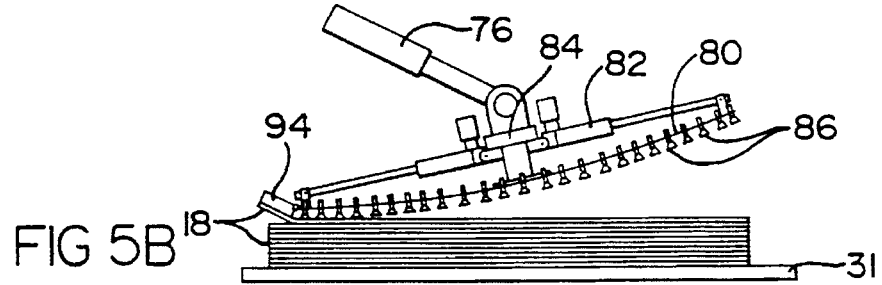
Figure 5C:
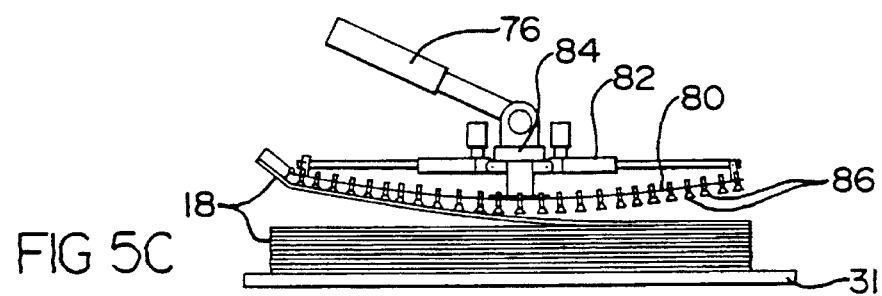
Figure 5D:
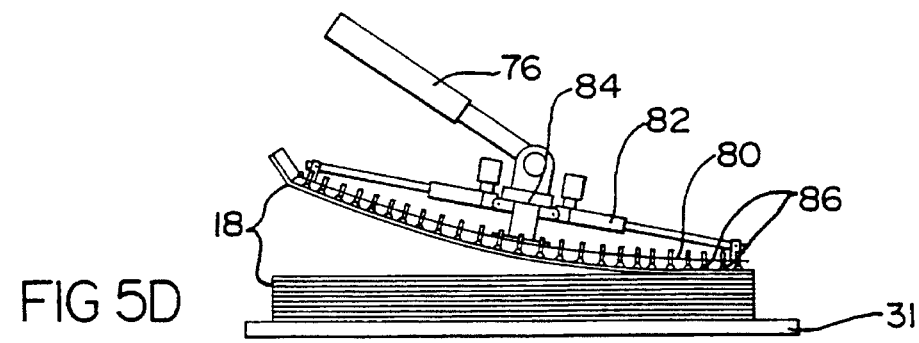
Figure 5E:
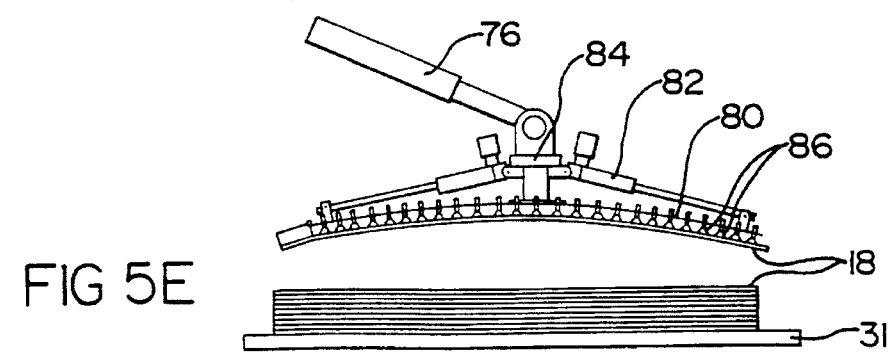
Figure 6A:
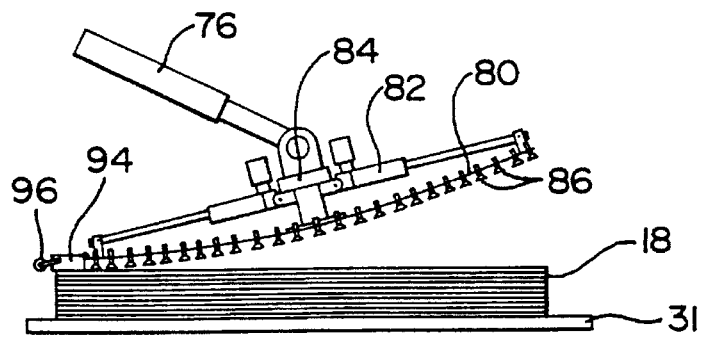
FIG. 6 are views similar to FIG. 5 illustrating an alternate sequence of operation of the windshield assembly system of FIG. 1.
Figure 6B:
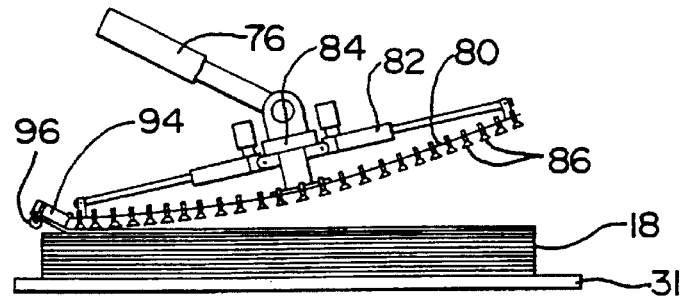
Figure 6C:
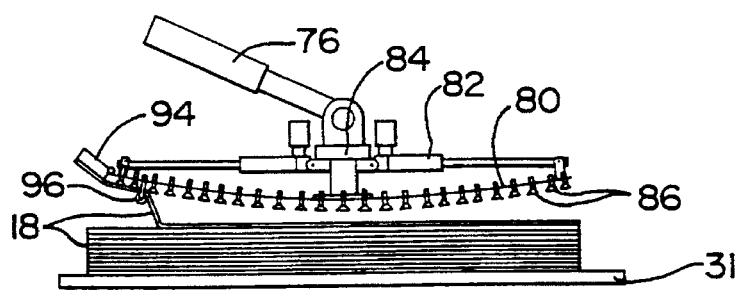
Figure 6D:
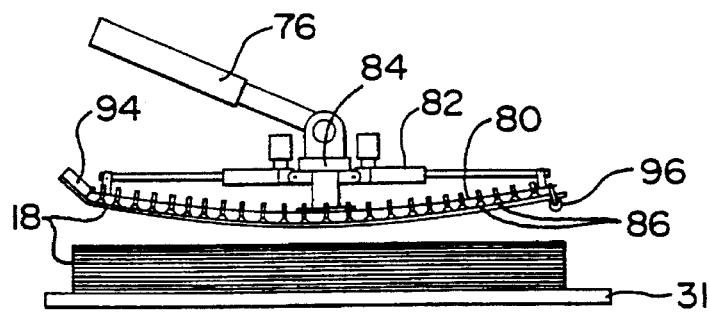
Figure 6E:
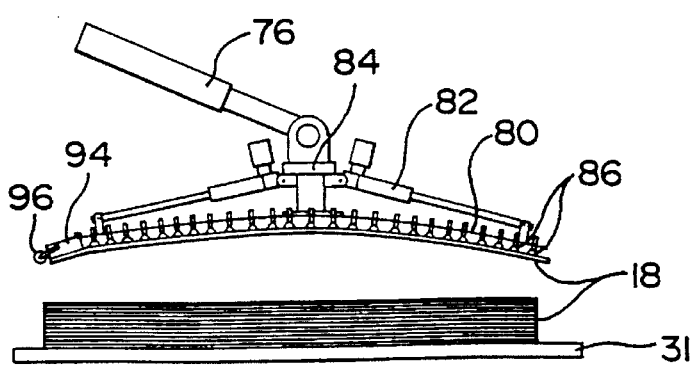

Referring to FIGS. 1 and 4, the windshield assembly system 10 further includes a third robot 76 for moving the removed adhesive sheet 18 relative to the stack of adhesive sheets 18 and the lower ply 14. One embodiment of the third robot 76 is a FANUC S-420 type and commercially available from FANUC Corporation of Auburn Hills, Mich. The third robot 76 has a pick-up platen or handler, generally indicated at 78, at one end for gripping an adhesive sheet 18 on the stack, removing the adhesive sheet 18 from the stack and placing the removed adhesive sheet 18 on the lower ply 14. The handler 78 includes a contourable pick-up or face plate 80 and a plurality of electromechanical actuators 82 connected to the face plate 80. The handler 76 includes a center anchor 84, connected to the electromechanical actuators 82 and fixedly mounted to an arm of the third robot 76. In one embodiment, the face plate 80 is made of a suitable material such as 0.040 inches stainless steel or 0.125 to 0.187 inches ultra high molecular weight (UHMW) plastic. Alternatively, the face plate 80 may be made of a 0.060 inch UHMW plastic backed by an adhesively attached 0.020 stainless steel sheet. Additionally, the handler 78 may have a base plate (not shown) made of a honeycomb material to assist in mounting the actuators 82 and a manifold 90 to be described.

The handler 78 also includes a plurality of vacuum cups 86 attached to the face plate 80 and spaced across its lower surface. Each vacuum cup 86 is fitted with a self-actuating valve, a mechanical device which allows the cup working surface to automatically vary in elevation from the lower surface of the face plate 80 and a mechanical mechanism to compensate for irregularities in the shape of the surface of the adhesive sheet 18. The handler 78 further includes a plurality of flex conduits 88 connected to the vacuum cups 86 and a manifold 90 connected to the flex conduits 88 and attached to the center anchor 84. The manifold 90 is also connected by conduits 92 to a source of vacuum (not shown). It should be appreciated that the electromechanical actuators 82 and vacuum cups 86 are conventional and known in the art. It should also be appreciated that the vacuum cups 86 may be selectively turned ON and OFF.

The handler 78 may include a vacuum lift bar 94 at a pillar edge of the face plate 80 and pivotally attached by a hinge 95 to an end of the face plate 80. The vacuum lift bar 94 is manipulated independently by an actuating mechanism 96 attached to the handler 78. The vacuum lift bar 94 has a plurality of vacuum cups 86 attached thereto and spaced across its lower surface. The vacuum cups 86 are attached by flex conduits 88 to the manifold 90. It should be appreciated that the vacuum lift bar 94 is manipulated independently of the remainder of the face plate 80 for the purpose of adding additional "peel effect" to that edge if required.

The handler 78 may include a stripper roller 96 for stripping the adhesive sheet 18. The stripper roller 96 is operatively connected to the handler 78 to move longitudinally back and forth along the face plate 80. The handler 78 also includes sensors (not shown) mounted around a periphery of the face plate 80 to read the periphery of the adhesive sheet 18 as well as the location of the gradient band.

Referring to FIG. 5, the third robot 76 positions the handler 78 relative to the stack of adhesive sheets 18 such that the face plate.80 is concave and the vacuum lift bar 94 contacts the pillar edge of the stack. The handler 78 activates the vacuum to the vacuum cups 86 on the vacuum lift bar 94 and lifts the pillar edge of the top adhesive sheet 18 free of the stack. The handler 78 advances to separate the top adhesive sheet 18 from the stack. The handler 78 progressively activates vacuum to the vacuum cups 86 on the face plate 80 as it advances to end of the face plate 80. The handler 78 recontours the face plate 80. The third robot 76 then moves the removed adhesive sheet 18 on to the assembly station.

Referring to FIG. 6, the handler 78 may include the stripper roller 96 for stripping the adhesive sheet 18. The third robot 76 positions the handler 78 relative to the stack of adhesive sheets 18 such that the face plate 80 is concave and the vacuum lift bar 94 contacts the pillar edge of the stack. The handler 78 activates the vacuum to the vacuum cups 86 on the vacuum lift bar 94 and lifts the pillar edge of the top adhesive sheet 18 free of the stack. The handler 78 advances the stripper roller 96 to separate the top adhesive sheet 18 from the stack. The handler 78 progressively activates vacuum to the vacuum cups 86 on the face plate 80 as the stripper roller 96 advances to end of the face plate 80. The handler 78 returns the stripper roller 96 to its home or original position and recontours the face plate 80. The third robot 76 then moves the removed adhesive sheet 18 on to the assembly station.

In the overall operation of the windshield assembly system 10, the lay-up conveyor 20 delivers an unlaminated contoured long ply 16 and short ply 14 to the assembly station. The second robot 70 positions the vacuum cups 72 adjacent the long ply 16 and applies a vacuum thereto. The second robot 70 lifts the long ply 16 above the lay-up conveyor 20. The short ply 14 is located by the squaring locator 24 and stopped in place along the lay-up conveyor 20. The first robot 38 grips the corner of the adhesive sheet 18 with the vacuum cup 40 and peels the corner away from the immediately adjacent lower adhesive sheet 18 about 1.0 inches to 2.0 inches to allow access for the knife 50 of the edge separator 44. The edge separator 44 moves or extends the knife 50 into the space between the adhesive sheets 18 and the first robot 38 releases the vacuum to the vacuum cup 40. The edge separator 44 moves the knife 50 elevationally and transversely across the pillar edge of the top adhesive sheet 18 for clearance and acceptance of the blade 62 of the sheet separator 60.

Next, the sheet separator 60 indexes the shade 64 and blade 62 parallel to the centerline of the stack in order to complete a full separation and isolation of the top adhesive sheet 18 from the immediately adjacent lower adhesive sheet 18 of the stack. It should be appreciated that the shade 64 serves as a clean flat working surface or table which contains the separated adhesive sheet 18. It should also be appreciated that the perforations in the shade 64 prevent a "local" vacuum from being drawn between the adhesive sheet 18 being handled and the shade 64.

To complete the assembly, the third robot 76 moves the handler 78 to the surface of the sheet separator 60 and recontours to a flat or convex configuration required to pick-up the separated adhesive sheet 18. The handler 78 picks-up the separated adhesive sheet 18 as previously described in connection with either FIGS. 5 and 6. The handler 78 grips the separated adhesive sheet 18 upon contact and lifts it from the surface of the sheet separator 60. The third robot 76 moves the removed adhesive sheet 18 near the lay-up conveyor 20 and the handler 78 recontours under software control to a pre-established shape near that of the short ply 14.

When the handler 78 nears the short ply 14, it pauses to "read" the position of the short ply 14 by sensing the configuration or peripheral shape and predetermined mark(s) in the gradient band and painted band. The third robot 76 maneuvers the handler 78 as required to accurately position the gradient band of the adhesive sheet 18 to the marks on the short ply 14 as well as the periphery of the short ply 14. Once in the correct relationship to the short ply 14, the vacuum to the vacuum cups 86 is released and the removed adhesive sheet 18 settles slowly to the short ply 14. The third robot 76 then positions the long ply 16 relative to the short ply 14. The vacuum to the vacuum cups 72 is discontinued and the long ply 16 settles on the adhesive sheet 18 and short ply 14. The squaring locator 24 retracts the locator arms 28 to release the windshield assembly 12 and the lay-up conveyor 20 moves the assembled windshield assembly 12 from the assembly station.

Accordingly, the windshield assembly system 10 features a first robot 38 to initially separate a corner of the adhesive sheet 18, an edge separator 44 to subsequently separate the pillar edge of the top adhesive sheet 18 from the adjacent lower adhesive sheet 18 on the stack and a sheet separator 60 to subsequently separate the full top adhesive sheet 18 from the adjacent lower adhesive sheet 18 on the stack. The sheet separator 60 isolates the top adhesive sheet 18 from the stack to a non-reactive surface so that no further tendency for the adhesive sheets 18 to stick together can occur. The windshield assembly system 10 has a handler 78 having a contourable face plate 80 with vacuum cups 86 and a robot 76 for moving the handler 78 and adhesive sheet 18 to the short ply 14 and a robot 70 for moving the long ply 16 initially from the lay-up conveyor 20 and finally to the adhesive sheet 18 and short ply 14.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A windshield assembly system for assembling windshield assemblies for vehicles comprising:

a conveyor for delivering at least two plys of glass to an assembly station;

a first robot for lifting one of the two plys from said conveyor;

at least one separator for separating at least a portion of a top adhesive sheet from a lower adhesive sheet on a stack of adhesive sheets, wherein said at least one separator comprises an edge separator having a knife moveable along an edge of the top adhesive sheet to separate the edge of the top adhesive sheet from the lower adhesive sheet in the stacks; and a second robot having a handler for gripping and removing the separated top adhesive sheet and placing the removed adhesive sheet adjacent the other one of the two plys, whereby the first robot places the one of the two plys adjacent the removed adhesive sheet to assemble the windshield assembly.

2. A windshield assembly system for assembling windshield assemblies for vehicles comprising:

a conveyor for delivering at least two plys of glass to an assembly station;

a first robot for lifting one of the two plys from said conveyor;

at least one separator for separating at least a portion of a top adhesive sheet from a lower adhesive sheet on a stack of adhesive sheets, wherein said at least one separator comprises a sheet separator having a blade moveable along a longitudinal length of the top adhesive sheet to separate the top adhesive sheet from the lower adhesive sheet in the stack; and a second robot having a handler for gripping and removing the separated top adhesive sheet and placing the removed adhesive sheet adjacent the other one of the two plys, whereby the first robot places the one of the two plys adjacent the removed adhesive sheet to assemble the windshield assembly.

3. A windshield assembly system for assembling windshield assemblies for vehicles comprising:

a conveyor for delivering at least two plys of glass to an assembly station;

a first robot for lifting one of the two plys from said conveyor;

a second robot having a vacuum cup for gripping and lifting a corner of a top adhesive sheet from a lower adhesive sheet in a stack of adhesive sheets a predetermined distance and an edge separator having a knife moveable longitudinally along an edge of the top adhesive sheet to separate the edge of the top adhesive sheet from the lower adhesive sheet in the stack;

a third robot having a handler for gripping and removing the separated top adhesive sheet and placing the removed adhesive sheet adjacent the other one of the two plys, whereby the first robot places the one of the two plys adjacent the removed adhesive sheet to assemble the windshield assembly.

4. A windshield assembly system for assembling windshield assemblies for vehicles comprising:

a conveyor for delivering at least two plys of glass to an assembly station;

a first robot for lifting one of the two plys from said conveyor;

a second robot having a vacuum cup for gripping and lifting a corner of a top adhesive sheet from a lower adhesive sheet in a stack of adhesive sheets a predetermined distance and a sheet separator having a blade moveable along a longitudinal length of the top adhesive sheet to separate the top adhesive sheet from the lower adhesive sheet in the stack;

a third robot having a handler for gripping and removing the separated top adhesive sheet and placing the removed adhesive sheet adjacent the other one of the two plys, whereby the first robot places the one of the two plys adjacent the removed adhesive sheet to assemble the windshield assembly.

* * * * *